United States Patent
Busaba et al.

(10) Patent No.: US 9,626,189 B2
(45) Date of Patent: Apr. 18, 2017

(54) REDUCING OPERAND STORE COMPARE PENALTIES

(75) Inventors: Fadi Busaba, Poughkeepsie, NY (US);
David Hutton, Tallahassee, FL (US);
John G. Rell, Jr., Saugerties, NY (US);
Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 982 days.

(21) Appl. No.: 13/524,356

(22) Filed: Jun. 15, 2012

(65) Prior Publication Data

US 2013/0339670 A1 Dec. 19, 2013

(51) Int. Cl.
*G06F 9/38* (2006.01)
*G06F 9/30* (2006.01)

(52) U.S. Cl.
CPC .......... *G06F 9/3838* (2013.01); *G06F 9/3017* (2013.01); *G06F 9/30043* (2013.01); *G06F 9/3834* (2013.01)

(58) Field of Classification Search
CPC .................................................. G06F 9/30043
USPC ................................................. 712/216, 225
See application file for complete search history.

(56) References Cited

U.S. PATENT DOCUMENTS

| 4,638,429 A | 1/1987 | Watabe et al. |
| 5,467,473 A | 11/1995 | Kahle et al. |
| 5,526,499 A * | 6/1996 | Bernstein ............... G06F 8/445 712/216 |
| 5,590,368 A | 12/1996 | Heeb et al. |
| 5,761,740 A | 6/1998 | Johnson et al. |
| 5,781,752 A | 7/1998 | Moshovos et al. |
| 5,881,307 A | 3/1999 | Park et al. |
| 5,987,595 A | 11/1999 | Yoaz et al. |
| 6,108,770 A | 8/2000 | Chrysos et al. |
| 6,249,862 B1 | 6/2001 | Chinnakonda et al. |

(Continued)

OTHER PUBLICATIONS

Hennessy and Patterson, "Computer Architecture: A Quantitative Approach", 4th Edition. Morgan Kaufmann, 2007. 6 pages.*

(Continued)

*Primary Examiner* — Andrew Caldwell
*Assistant Examiner* — Michael Metzger
(74) *Attorney, Agent, or Firm* — Cantor Colburn LLP; Margaret A. McNamara

(57) ABSTRACT

Embodiments relate to reducing operand store compare penalties by detecting potential unit of operation (UOP) dependencies. An aspect includes a computer system for reducing operation store compare penalties. The system includes memory and a processor. The system performs a method including cracking an instruction into units of operation, where each UOP includes instruction text and address determination fields. The method includes identifying a load UOP among the plurality of UOPs and comparing values of the address determination fields of the load UOP with values of address determination fields of one or more previously-decoded store UOPs. The method also includes forcing, prior to issuance of the instruction to an execution unit, a dependency between the load UOP and the one or more previously-decoded store UOPs based on the comparing.

19 Claims, 9 Drawing Sheets

(56) References Cited

U.S. PATENT DOCUMENTS

| | | | |
|---|---|---|---|
| 6,463,523 B1 | 10/2002 | Kessler et al. | |
| 6,622,237 B1 | 9/2003 | Keller et al. | |
| 6,701,425 B1 * | 3/2004 | Dabbagh et al. | 712/225 |
| 6,862,645 B2 | 3/2005 | Garnett | |
| 6,912,648 B2 | 6/2005 | Hammarlund et al. | |
| 6,931,515 B2 | 8/2005 | Ross et al. | |
| 7,062,638 B2 | 6/2006 | Yoaz et al. | |
| 7,181,598 B2 | 2/2007 | Jourdan et al. | |
| 7,441,107 B2 * | 10/2008 | Hammond et al. | 712/225 |
| 7,975,130 B2 | 7/2011 | Alexander et al. | |
| 2003/0196075 A1 | 10/2003 | Akkary et al. | |
| 2003/0217251 A1 | 11/2003 | Jourdan et al. | |
| 2005/0010743 A1 | 1/2005 | Tremblay et al. | |
| 2007/0288725 A1 | 12/2007 | Luick | |
| 2007/0288726 A1 | 12/2007 | Luick | |
| 2009/0282225 A1 * | 11/2009 | Caprioli et al. | 712/225 |
| 2010/0049952 A1 * | 2/2010 | Eddy et al. | 712/223 |
| 2010/0049953 A1 * | 2/2010 | Mylavarapu et al. | 712/225 |
| 2010/0169619 A1 * | 7/2010 | Yeh et al. | 712/224 |
| 2010/0293347 A1 * | 11/2010 | Luttrell | 711/156 |

OTHER PUBLICATIONS

Z/Architecture: "Principles of Operation"; Sixth Edition, Apr. 2007, Publication No. SA22-7832-05, copyright IBM Corp. 1990-2007, p. 1-1218.

* cited by examiner

REDUCING OPERAND STORE COMPARE PENALTIES

BACKGROUND

The present embodiments relate to reducing operand store compare (OSC) penalties, and more particularly to comparing address determination fields of cracked load and store units of operation (UOPs) to detect potential dependencies.

A processor accesses operands according to instruction-defined methods. The instruction may provide an immediate operand using the value of a portion of the instruction, or may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by International Business Machine's (IBM) z/Architecture™ long displacement facility wherein the instruction defines a base register, an index register and an immediate field (displacement field) that are added together to provide the address of the operand in memory. A value of zero in the base or index field specifies that no base or index is to be applied, and thus, a general register is not to be designated as containing a base address or index.

Reducing cycles per instruction (CPI) improves processor performance. CPI may be increased by operand store compare (OSC) penalties which occur when an instruction with an operand to store data to memory is followed by an instruction to load the data from the same memory location before the data actually reaches the memory. The memory may be indicated by the implied registers, memory locations, immediate fields, or combinations of registers and immediate fields indicated in the opcode of instructions. One problem with handling of OSC is that it may not be recognized until after a memory access address is formed, which may occur after the instruction has been issued. Costly processor pipeline stall, recycle and reset mechanisms are necessary to remedy an OSC. The stall and reset mechanisms may result in a penalty of many cycles of unused processing time.

In a system with processors capable of out-of-order (OOO) processing, in which instructions may be processed out-of-order relative to the order in which they are fetched and decoded, the OSC penalties may increase, since an incorrect loaded value obtained by a load instruction subject to the OSC may have been used in downstream instructions.

SUMMARY

Exemplary embodiments include a computer system for reducing operand store compare (OSC) penalties. The system includes memory configured to store instructions and data. The system further includes a processor configured to execute the instructions to perform functions indicated by the instructions. The system is configured to perform a method including cracking an instruction into one or more units of operation (UOPs), each UOP comprising instruction text (itext) and including address determination fields required to form an operand storage address. The method includes identifying, by a processor, a load UOP among the one or more UOPs and comparing, by the processor, values of the address determination fields of the load UOP with values of address determination fields of one or more previously-decoded store UOPs. The method further includes forcing, by the processor and prior to issuance of the instruction to an execution unit, a dependency between the load UOP and the one or more previously-decoded store UOPs based on the comparing the values of the address determination fields of the load UOP with the values of the address determination fields of the one or more previously-decoded store UOPs.

Additional exemplary embodiments include a computer implemented method for reducing operand store compare (OSC) penalties. The method includes cracking an instruction into one or more units of operation (UOPs), each UOP comprising instruction text (itext) and including address determination fields required to form an operand storage address. The method includes identifying, by a processor, a load UOP among the one or more UOPs and comparing, by the processor, values of the address determination fields of the load UOP with values of address determination fields of one or more previously-decoded store UOPs. The method further includes forcing, by the processor and prior to issuance of the instruction to an execution unit, a dependency between the load UOP and the one or more previously-decoded store UOPs based on the comparing the values of the address determination fields of the load UOP with the values of the address determination fields of the one or more previously-decoded store UOPs.

Further exemplary embodiments include a computer program product for reducing operand store compare (OSC) penalties. The computer program product includes a tangible storage medium readable by a processing circuit and storing instructions for execution by the processing circuit for performing a method. The method includes cracking an instruction into one or more units of operation (UOPs), each UOP comprising instruction text (itext) and including address determination fields required to form an operand storage address. The method includes identifying, by a processor, a load UOP among the one or more UOPs and comparing, by the processor, values of the address determination fields of the load UOP with values of address determination fields of one or more previously-decoded store UOPs. The method further includes forcing, by the processor and prior to issuance of the instruction to an execution unit, a dependency between the load UOP and the one or more previously-decoded store UOPs based on the comparing the values of the address determination fields of the load UOP with the values of the address determination fields of the one or more previously-decoded store UOPs.

Additional features and advantages are realized through the techniques of the disclosed embodiments. Other embodiments and aspects of the disclosure are described in detail herein. For a better understanding of the embodiments with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, the address determination fields of a load unit of operation (UOP) of a cracked instruction are compared with the corresponding address determination fields of one or more previously dispatched store UOPs to detect potential dependencies among the load and store UOPs.

Figure 1:
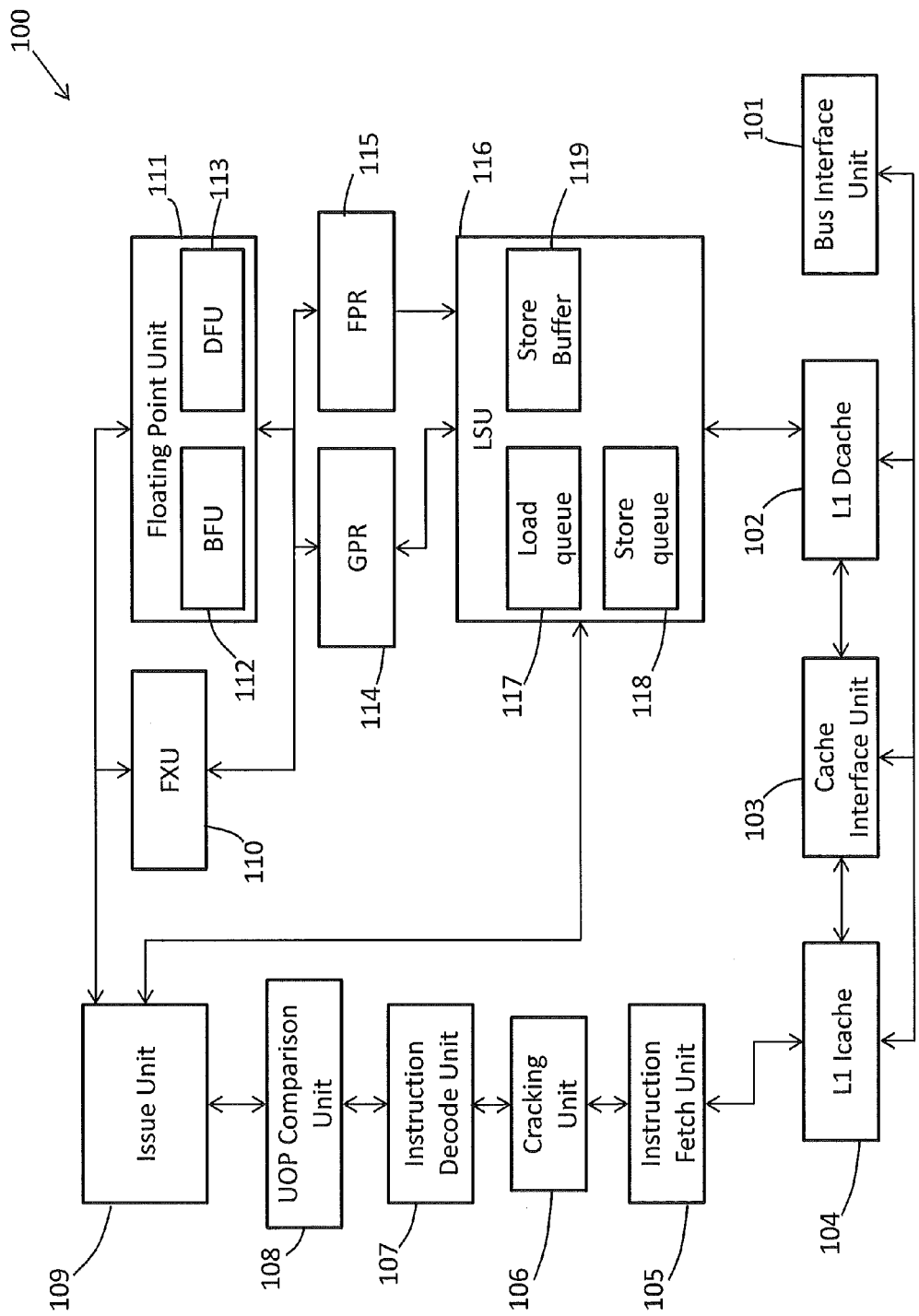
FIG. 1 illustrates a block diagram of a processing circuit according to one embodiment of the present disclosure.

FIG. 1 illustrates a block diagram of a processing circuit 100 according to an embodiment of the present disclosure. The processing circuit 100 may comprise one processing core of a plurality of processing cores in a multi-threading processor, or a sequential or non-multi-threading processor. The processing circuit 100 includes a bus interface unit 101 that couples the processing circuit 100 to other processors and peripheral devices. The bus interface unit 101 also connects L1 Dcache 102, which reads and stores data values, L1 Icache 104, which reads program instructions, and a cache interface unit 103 to external memory, processors, and other peripheral devices.

The L1 Icache 104 provides loading of instruction streams in conjunction with an instruction fetch unit 105, which pre-fetches instructions and may include speculative loading and branch prediction capabilities. The fetched instructions are provided to a cracking unit 106, which may break up a complex instruction into units of operation (UOPs) made up of instruction text (itext), and the UOPs may be distributed among multiple processing paths, pipelines, execution units, etc.

The fetched instructions, including the cracked UOPs are decoded by an instruction decode unit (IDU) 107 into instruction processing data. Although the cracking unit 106 and the instruction decode unit 107 are illustrated as separate units or functional blocks, embodiments of the present disclosure encompass an instruction decode unit 107 that includes a cracking unit 106, or that performs a cracking operation in connection with a decode operation.

The IDU 107 provides the instructions to a UOP comparison unit 108 which identifies load and store UOPs among the UOPs of the decoded and cracked instruction and analyzes the itext of the UOPs to compare address determination values of load UOPs with those of store UOPs to detect operand store compare (OSC) occurrences. If a dependency of the load UOP on one of the store UOPs is detected, the UOP comparison unit 108 may determine whether to force a dependency between the load operation and the store UOPs, so that the load operation is issued after the issue of the store UOPs avoiding any reject on the load operation. In the present specification and claims, the term "force a dependency" means designating a load UOP as being dependent upon one or more store UOPs to cause the load UOP to be issued after the one or more store UOPs. The dependency may be forced based on the address field information in the instructions, even if the actual addresses are unknown, such as when the operand address values have not yet been resolved in the process of executing the UOPs. In particular, the UOP comparison unit 108 may compare a presently-identified load UOP with a previously decoded and/or dispatched store UOP to detect if a dependency should be forced.

The UOP comparison unit 108 sends the UOPs of the decoded and cracked instructions to an issue unit 109 which controls the issuing of the instructions and UOPs of decoded and cracked instructions to various execution units, such as one or more fixed point units (FXU) 110 for executing general operations and one or more floating point units (FPU) 111 for executing floating point operations. The FPUs 111 can include a binary floating point unit 112, a decimal floating point unit 113, or any other floating point unit. The issue unit 109 is also coupled to one or more load/store units (LSU) 116 via one or more LSU pipelines. The multiple LSU pipelines are treated as execution units for performing loads and stores and address generation for branches. In some embodiments, the issue unit 109 may issue multiple UOPs of a cracked instruction simultaneously or out of order.

The FXU 110 and FPU 111 are coupled to various resources, such as general-purpose registers (GPR) 114 and floating point registers (FPR) 115. The GPR 114 and FPR 115 provide data value storage for data values loaded and stored from the L1 Dcache 102 by a load store unit (LSU) 116.

In addition, in one embodiment the LSU 116 includes a load queue (LDQ) 117, a store queue (STQ) 118, and a store buffer (STB) 119. The LDQ 117 and the STQ 118 each comprises entries that track additional information associated with outstanding load and store operations. For example, the entries of the LDQ 117 may include a starting address and ending address of a load instruction, and the entries of the STQ 118 may include the starting address and ending address of store data. The STB 119 may comprise entries where a store instruction saves data prior to writing the data to the L1 Dcache 102.

Figure 2:
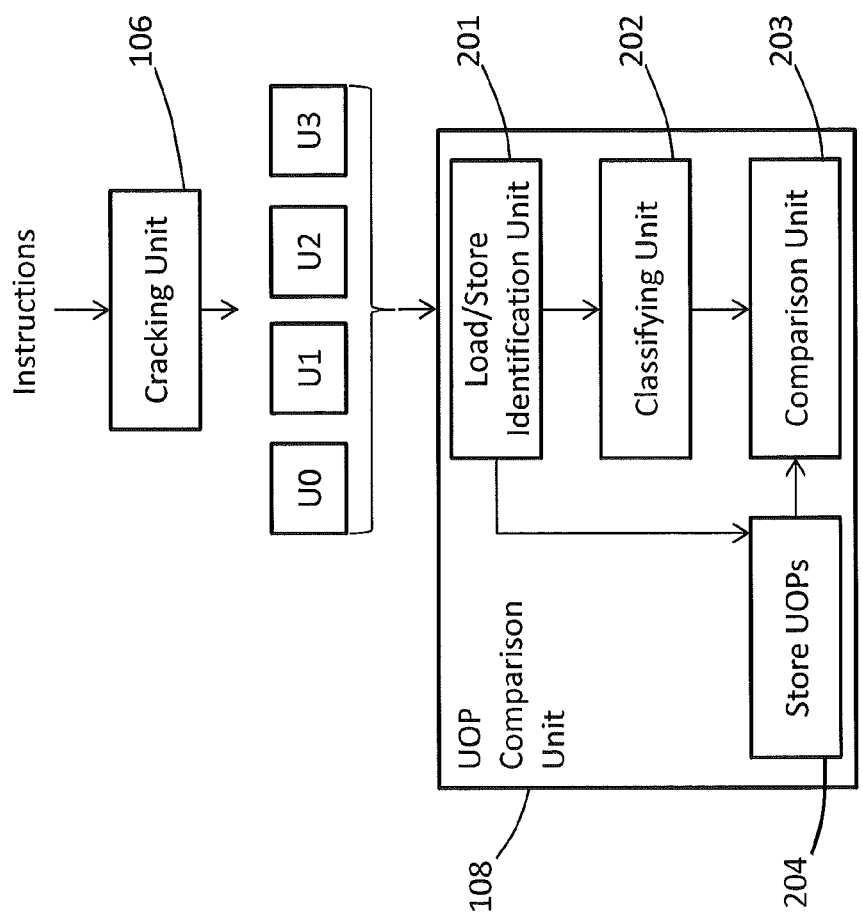
FIG. 2 illustrates a UOP comparison unit according to an embodiment.

FIG. 2 illustrates the cracking unit 106 and UOP comparison unit 108 of FIG. 1 in further detail. The instruction decode unit 107 is omitted for purposes of description. The cracking unit 106 receives instructions in program order from instruction fetch unit 105. Cracking unit cracks complex instructions to multiple UOPs, such as UOPs U0, U1, U2, and U3 illustrated in FIG. 2. Each of the cracked UOPs may be a load UOP, a store UOP, both a load and a store UOP, or neither a load UOP nor a store UOP. The cracking unit 106 divides the instruction into the multiple UOPs such that each UOP may be executed independently of each other UOP, such as simultaneously or out-of-order.

The UOP comparison unit 108 includes a load/store identification unit 201 that analyzes each UOP U0, U1, U2, and U3 and determines if one or more of the UOPs is a load UOP or a store UOP. For purposes of description only, and by way of example, it will be assumed here that U1 is the only load or store UOP among UOPs U0, U1, U2, and U3, and that UOP U1 is a store UOP. However, it is understood that embodiments of the present disclosure encompass instructions having multiple store UOPs, multiple load UOPs, single load UOPs, and any combination of load and store UOPs. In addition, it is understood that a single instruction may be cracked into any number of UOPs, such as two-or-more UOPs, and each instruction may include any number of load UOPs or any number of store UOPs, according to the instruction type.

The UOP comparison unit 108 includes a classifying unit 202 that classifies the load or store UOPs according to a UOP type. In particular, the classifying unit 202 may classify UOPs of different types into various groups having similar predetermined characteristics. In one embodiment, the classifying unit 202 classifies UOPs based on address determination fields within the UOP. Address determination fields may include a base address field, index address field, and a displacement address field. These fields are required at execution time to determine the operand storage address. For example, the base and index register contents are read from the GPR 114 and sent to LSU 116 to form the storage operand address. In one embodiment, the classifying unit 202 classifies each UOP of any type of UOP for which each of the base field, index field, and displacement field are the same.

Figure 3:
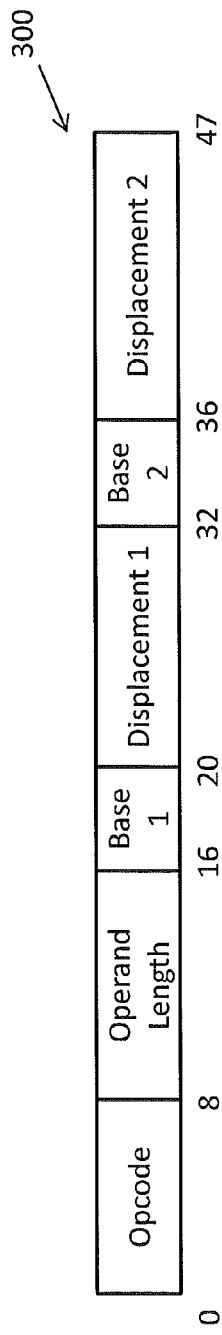
FIGS. 3-5 illustrate examples of UOPs according to embodiments of the present disclosure.

In one embodiment, the classifying unit 202 may classify instructions into a first group corresponding to storage-to-storage (SS) decimal operations, such as AP, SP, UNPK, MVO, etc. These instructions have a format similar to the format illustrated in FIG. 3. There are two storage operands identified with each having its own base, displacement and length fields. The first operand on these SS-type instructions has a variable length operand ranging from 1 to 16 bytes. In one embodiment, operand accesses to the LSU 116 are made in increments of 8 bytes. As a result, two UOPs may be needed to fetch and store the first operand. One of these UOPs fetches/stores 8 bytes and the second UOP fetches/stores the rest of the bytes. The first UOP for the first operand which is a load and a store UOP has the following configuration: base address field: bits 16-19 (B1 field in 300), displacement address field: bits 20-31 (D1 field in 300), and operand length: bits 8-11 if length greater than 9 or 8 otherwise (Operand Length field in 300). Since there is not an index field in SS-ops, the index field values of SS-ops is forced to zeros.

When required, the second UOP of the first operand which is also a load and a store UOP has the following configuration: base address field: bits 16-19 (B1 field in 300), displacement address field: bits 20-31 plus 8 (D1 field in 300), and operand length: bits 8-11 minus 8. A second operand may also have two UOPs. The first UOP, which is load UOP, has the following configuration: base address field: bits 32-35, displacement address field: bits 36-47, and operand length: bits 12-15. The second UOP, which is a load, has the following configuration: base address field: bits 32-35, displacement address field: bits 36-47 plus 8. The index field values of the second UOP of the first operand and the first and second UOPs of the second operand are also forced to zeros.

Figure 4:
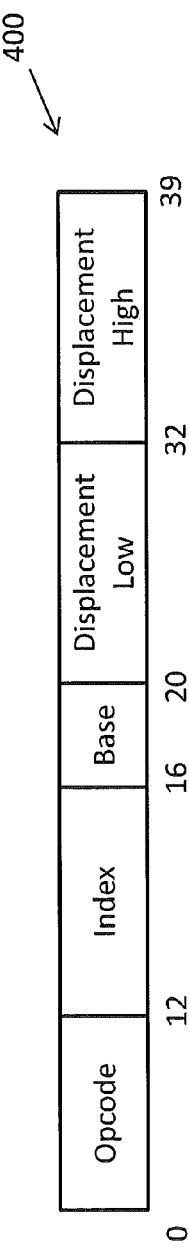

In one embodiment, the classifying unit 202 may classify instructions into a second group including register transfer (RX) instructions, such as ST, STH, STE, STD, STG, etc. These UOPs have the following configuration: index field: bits 12-15, base field: bits 16-19, first displacement field: bits 20-31, second displacement field: bits 32-39. FIG. 4 illustrates an example of a UOP 400 corresponding to the second group. The UOP 400 may include opcode from bits 0-11, an index field from bits 12-15, a base field from bits 16-19, a first displacement field (displacement low) from bits 20-31, and a second displacement field (displacement high) from bits 32-39.

Figure 5:
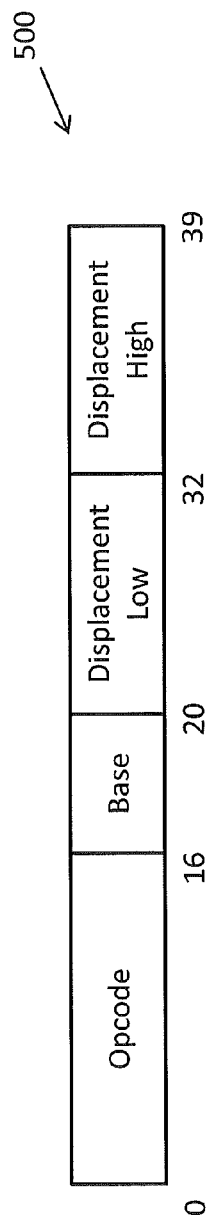

In one embodiment, the classifying unit 202 may classify instructions into a third group including SI or SIY format instructions, such as OI and OIY. These UOPs have the following configuration: (no index, so index value is 0000), base field: bits 16-19, first displacement field: bits 20-31, second displacement field: bits 32-39. FIG. 5 illustrates an example of a UOP 500 corresponding to the third group. The UOP 500 may include opcode from bits 0-15, a base field from bits 16-19, a first displacement field (displacement low) from bits 20-31, and a second displacement field (displacement high) from bits 32-39.

In one embodiment, the classifying unit 202 may classify the instructions into a fourth group including multiple store instructions, such as STM, STMG, etc. These UOPs have the following configuration: base field: bits 16-19, displacement field: bits 32-39+8 times a UOP number. Since the UOPs have no index fields, the index field values are forced to zeros. For example, UOP0 stores 8 bytes starting at the memory operand address (=Base-register+Displacement), UOP1 stores the next 8 bytes starting at address Base-register+Displacement+(8*1), UOP2 stores the next 8 bytes starting at address Base-register+Displacement+(8*2) and UOPx stores the last 8 bytes of the storage operand starting at address Base-register+Displacement+(8*x).

In addition, the classifying unit 202 may classify load instructions that correspond to the respective store instructions of the first through fourth groups.

The UOP comparison unit 108 further includes a comparison unit 203 that compares the identified and classified load and store UOPs. The comparison unit 203 may compare each of a base field, an index field, and a displacement field of a previously dispatched store operation with an identified load operation. If the fields all match, the UOP comparison unit 108 forces the load UOP to be dependent on one or more of the store UOPs that match the comparison, which may result in the load UOP being issued after the store UOPs.

In embodiments in which the load and store operations omit the index field, the comparison unit 203 may provide a value of 0 for the index field for the comparison. In addition, in embodiments in which the UOPs include multiple displacement fields corresponding to multiple operands, the comparison unit 203 may compare the values of the one or more displacement fields of the load UOP with the one or more displacement fields of each of the previously-dispatched store UOPs.

In one embodiment, the comparison unit 203 may compare an identified load UOP with a previously-dispatched or a previously-decoded store UOP corresponding to the same dispatch group. For example, if the identified load UOP corresponds to a storage-to-storage (SS) decimal operation, then the comparison unit 203 may compare the identified load UOP to one or more previously-dispatched or previously decoded store UOPs from the first group, corresponding to SS decimal operations. Similarly, if the identified load UOP corresponds to a transfer-to-register (RX) operation, then the comparison unit 203 may compare the identified load UOP to one or more previously-dispatched or decoded store UOPs from the second group, corresponding to RX operations. Accordingly, the comparison unit 203 may compare an identified load UOP with dispatched or decoded store UOPs based on a location of address determination fields within the load and store UOPs.

In one embodiment, the comparison unit 203 may compare an identified load UOP with a previously-dispatched or a previously-decoded store UOP corresponding to the different dispatch groups. For example, if the identified load UOP corresponds to a storage-to-storage (SS) decimal operation, then the comparison unit 203 may compare the identified load UOP to one or more previously-dispatched or previously decoded store UOPs from the second group, corresponding to RX operations, the third group, corresponding to the SI or SIY store format, or the fourth group.

Accordingly, the comparison unit 203 may compare an identified load UOP with dispatched or decoded store UOPs based on a location of address determination fields within the load and store UOPs.

In one embodiment, the comparison unit 203 may utilize one or more of an offset and a mask to determine whether an address determination field of an identified load UOP corresponds to an address determination field of a dispatched or decoded store UOP. In one embodiment, a load UOP of one group may be compared with a store UOP of another group, or in which at least one of the base, index, and displacement fields is located at a different position within the store UOP than the identified load UOP. For example, if a base field in the identified load UOP comprises 4 bits beginning at bit 16 of the load UOP, but the base field of a dispatched or decoded store UOP comprises 4 bits beginning at bit 12 of the dispatched or decoded store UOP, the comparison unit 203 may provide an offset of −4 bits to the load UOP to perform a comparison with the store UOP.

In an embodiment in which the comparison unit 203 utilizes a mask to mask bits of the displacement field, these bits may be disregarded in a comparison. In other words, if a displacement field of a load UOP has two masked bits, the comparison unit 203 will indicate that the operand address value of the load UOP matches that of a store UOP if the address values of the load and store UOPs match, regardless of the values of the masked bits (i.e. the masked bits may have any value 0, 1, 2, or 3, and a match will be indicated). The comparison unit 203 may determine whether to apply a mask and a size of the mask based on any number of factors, including a range and size of a variable storage instruction and a known size of operands of the load and store instructions. The mask may be dynamically controlled by software to correspond to the instructions and UOPs being compared by the comparison unit 203. The mask may also be provided by hardware.

Figure 6:
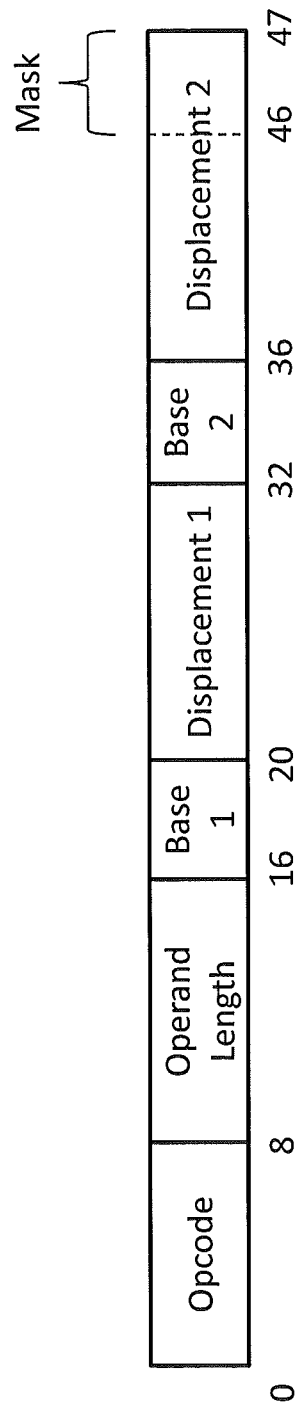
FIG. 6 illustrates masking according to one embodiment.

FIG. 6 illustrates masking least significant bits of a load UOP according to one embodiment. The masking may be performed by software or may be provided as a hardware hint. In FIG. 6, the two least significant bits of the second displacement field D2 are masked by software or hardware for each of the load and store UOPs. Accordingly, when the load UOP is compared with a store UOP, the displacement addresses of the store and load UOPs may be considered a match based on the bits 36-45, regardless of the values of bits 46 and 47. In other words, a load UOP with a Base=4, Index=8 and displacement=0 will match against a store UOP with Base=4, Index=8, Displacement=0,1,2, or 3 (corresponding to the value of the two bits). Therefore, a load from memory location 1002-100x is made dependent on a store to memory locations 1000-100x.

In one example, the comparison unit 203 may recognize that an operand of the load UOP has a size of 8 bytes. In other words, the load UOP would access addresses in a range of (base+index+displacement value) to (base+index+displacement value+8) bytes. The mask may be configured to designate as a match or a hit each of the address values within the range of 8 bytes accessed by the load UOP. Accordingly, the comparison unit 203 may mask a number of bits of the displacement fields of the load and store UOPs corresponding to a displacement of 7 bytes. Consequently, even if the store operation included fields that would store data into addresses in a range from (base+index+displacement value−4) bytes to (base+index+displacement value+4) bytes, the comparison unit 203 may provide a mask resulting in forcing a dependency of the load UOP on the store UOPs, which may result in delaying issuance of the load UOP until after issuance of the store UOPs. Without application of the mask, no match would be detected since the displacement values of the load and store UOPs are not the same, even though the operand length of the load and store operations may result in an actual dependency between the operations. By applying the mask, a match may be detected between the load and store UOPs based on an overlap in the range of addresses accessed by the load and store UOPs.

In one embodiment, the UOP comparison unit 108 may retain a predetermined number of dispatched store UOPs 204 to compare to the identified load UOPs. For example, in one embodiment, the UOP comparison unit 108 retains between one and four dispatched store UOPs for comparison with load UOPs. In one embodiment, the UOP comparison unit 108 retains between one and four dispatched store UOPs corresponding to each dispatch group organized by the classifying unit 202. The comparison unit 203 may compare a load UOP with two or more previously-dispatched store UOPs. The UOP comparison unit 108 may retain, for example, opcode, base, index, and displacement field information corresponding to the dispatched store UOPs.

In one embodiment, an instruction or condition may result in a flush or clearing of the stored UOPs 204. The flush condition may be the result of a hardware instruction, such as an error detection response, or software instructions, such as initialization instructions or any other instructions. In one embodiment, only one or more of the store UOPs, but fewer than all of the store UOPs, may be cleared. For example, a store UOP may be cleared if it is determined that an younger, or later-dispatched, instruction has changed an address (such as in a GPR) corresponding to the base field or index field of the store instruction.

In another embodiment, the UOP comparison unit 108 determines whether to count multiple stores in a cracked instruction as a single store UOP or as multiple store UOPs. For example, if a convert-to-decimal instruction is cracked into a first UOP that generates a cache address and test address, and a second UOP stored data to memory, the UOP comparison unit 108 may determine that only the second UOP should be compared by the comparison unit 203.

Figure 7:
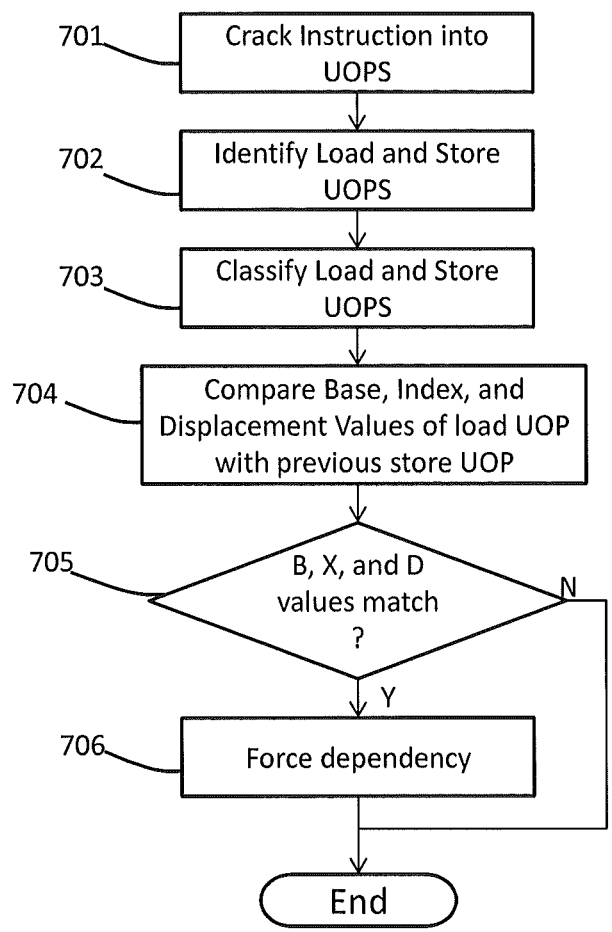
FIG. 7 illustrates a flowchart of a method according to one embodiment.

FIG. 7 illustrates a block diagram of a method according to an embodiment of the disclosure. In block 701, a complex instruction is cracked into UOPs that may be dispatched and executed out-of-order or simultaneously. Examples of complex instructions include MVC, AP, and other complex instructions that comprise multiple UOPs.

In block 702, load and store UOPs are identified among the multiple UOPs of the cracked instructions. In block 703, the load and store UOPs are divided into categories or groups based on characteristics of the UOPs. In one embodiment, the UOPs are classified according to a location within the UOP of address determination fields, such as a base, index, and displacement field. In one embodiment, different instructions having the same locations within the UOP for base, index, and displacement fields may be classified or grouped together.

In block 704 a presently-identified load UOP is compared with one or more previously-dispatched store UOPs to determine whether the address determination fields match. In one embodiment, an offset may be implemented to compare two UOPs having address determination fields located at different positions within the UOP. In another embodiment, a mask may be used to mask one or more of the bits of a displacement field to increase a range of addresses that generate a match between the load and store UOPs.

In yet another embodiment, the identified load UOP may be compared with two or more previously-dispatched store UOPs. The previously-dispatched store UOPs may be of a same dispatch group or different dispatch group as the load UOP.

In block 705, it is determined whether the address determination fields (base (B), index (X), and displacement (D)) match between the load UOP and the one or more previously-dispatched store UOPs. In embodiments in which a mask is applied to the displacement fields of the load and store UOPs, it is determined whether the values of the displacement fields having portions masked correspond between the load and store UOPs.

In block 706, if a match is detected, then the load UOP is forced to be dependent of the matching store UOP. The load UOP issues to the LSU after the one or more store UOPs have been issued to avoid any pipeline stalls or rejects.

Figure 8:
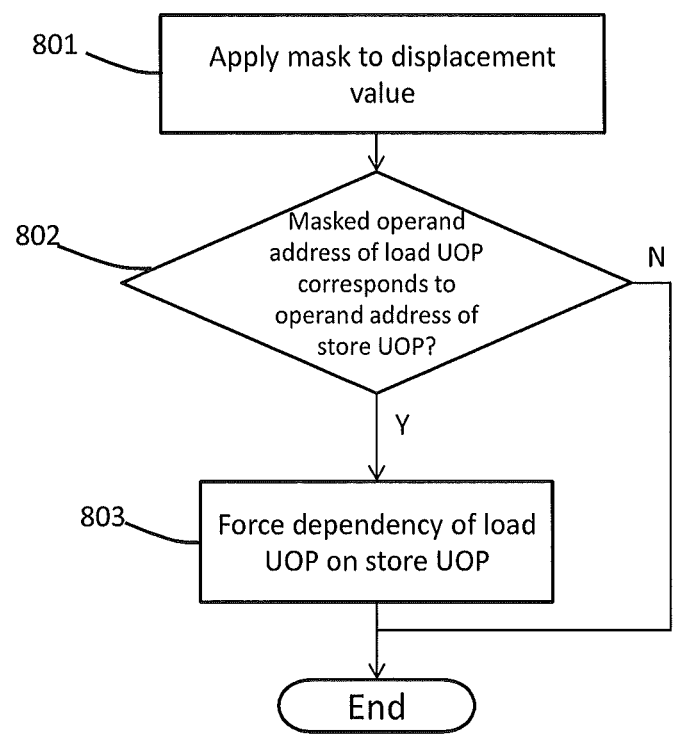
FIG. 8 illustrates a flowchart of a method according to another embodiment.

FIG. 8 illustrates a method of applying a mask to displacement values of the load and store UOPs according to an embodiment of the disclosure. In block 801, a mask is applied to the displacement values of one or more of a presently-identified load UOP and a previously-dispatched store UOP. For example, the mask may be applied to each of the load UOP and the store UOP. The mask may be a configurable mask that may be adjusted based on characteristics of the load and store UOPs, such as an operand length of the load and store UOPs. The mask may be adjusted by software either by a user input or automatically based on conditions or parameters sensed by a processing circuit. In one embodiment, the mask is provided by hardware.

In block 802, it is determined whether the address determination fields of the load UOP having the masked displacement value correspond to the address determination fields of the store UOP. The address determination fields may match when the masked bits are treated as having any one of the possible values represented by the bits. In other words, a load UOP with a Base=4, Index=8 and displacement=0 will match against a store UOP with Base=4, Index=8, Displacement=0, 1, 2, or 3 (corresponding to every possible value of the two bits).

In block 803, if it is determined that the values correspond to each other or match, the load UOP is made dependent on the store UOP. Accordingly, even when an operand address value of a load UOP is not precisely the same as the operand address of a store UOP, the load UOP may be forced to depend on the store UOP by masking one or more bits of the load UOP to increase an operand address value range of the load UOP that corresponds to the operand address value of the store UOP.

Figure 9:
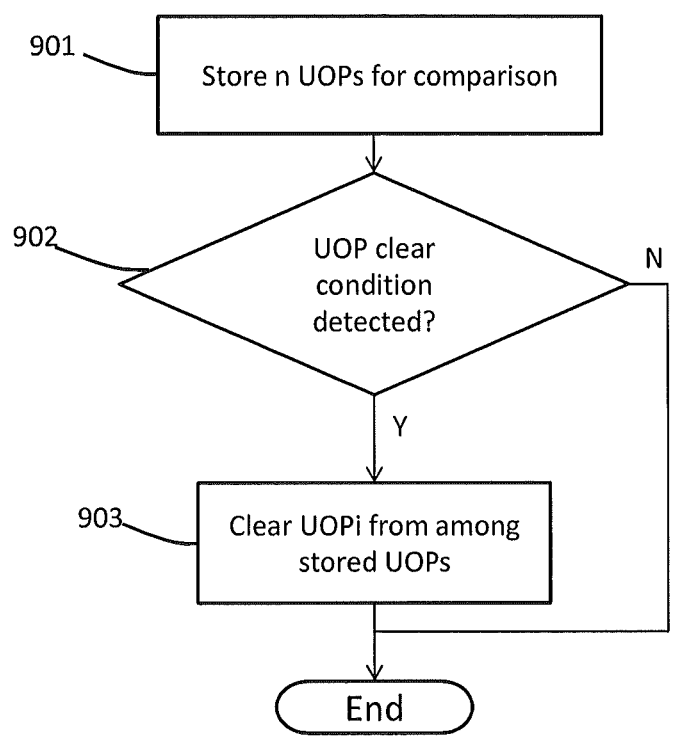
FIG. 9 illustrates a flowchart of a method according to another embodiment.

FIG. 9 illustrates a method of clearing one or more store UOPs according to an embodiment of the disclosure. In block 901, n store UOPs are saved or stored to be compared to younger or subsequently-fetched or decoded load UOPs. The n store UOPs may be between 1 and 5 UOPs, such as 2 or 3 UOPs. In one embodiment in which UOPs are divided into multiple groups based on characteristics in the UOP, such as address determination field locations, the n store UOPs may be saved for each group.

In block 902, it is determined whether a condition has been detected for clearing the UOP. For example, it may be determined whether a flush hardware command or software instruction has been detected. In addition, it may be determined whether a base or index address of a store UOP has been changed in one or more registers, such as a GPR. In block 903, if the UOP clear condition has been detected, the particular UOP, UOPi, may be cleared from among the saved store UOPs. In the event that a flush instruction or command is detected, all the saved store UOPs may be cleared simultaneously.

Figure 10:
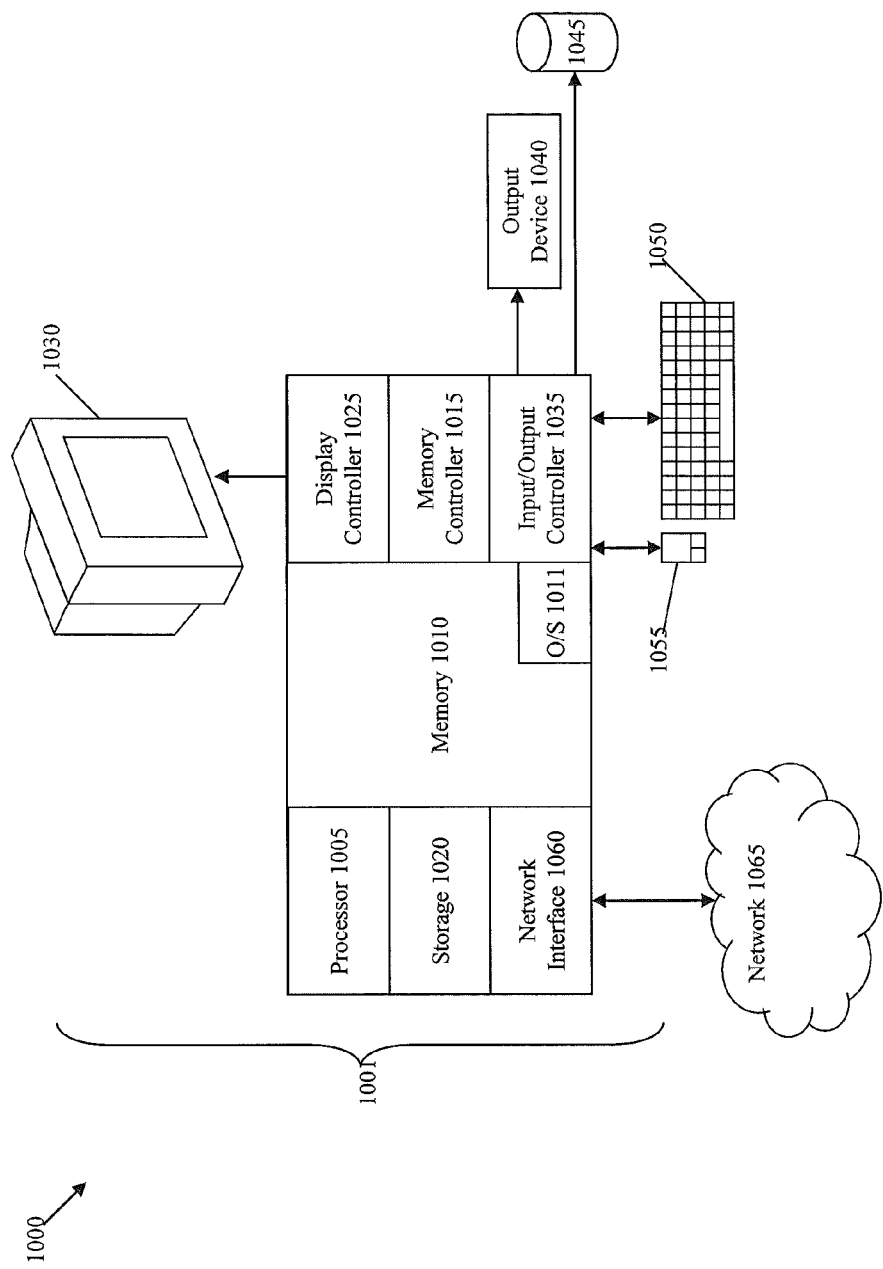
FIG. 10 illustrates a computer system according to one embodiment.

FIG. 10 illustrates a block diagram of a system 1000 for reducing OSC penalties according to one embodiment. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 1000 therefore includes a general-purpose computer 1001.

In an exemplary embodiment, in terms of hardware architecture, as shown in FIG. 10, the computer 1001 includes a processor 1005, which may be a multi-threading processor 1005 configured to execute multiple UOPs of an instruction simultaneously or out-of-order, memory 1010 coupled to a memory controller 1015, and one or more input and/or output (I/O) devices 1040, 1045 (or peripherals) that are communicatively coupled via a local input/output controller 1035. The input/output controller 1035 can be, for example but not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1005 is a hardware device for executing software, particularly that stored in storage 1020, such as cache storage, or memory 1010. The processor 1005 can be any custom made or commercially available processor, a central processing unit (CPU), an auxiliary processor among several processors associated with the computer 1001, a semiconductor based microprocessor (in the form of a microchip or chip set), a macroprocessor, or generally any device for executing instructions.

The memory 1010 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, and/or other types of storage media. Note that the memory 1010 can have a distributed architecture, where various components are situated remote from one another, but can be accessed by the processor 1005.

The instructions in memory 1010 may include one or more separate programs, each of which comprises an ordered listing of executable instructions for implementing logical functions. In the example of FIG. 10, the instructions in the memory 1010 a suitable operating system (OS) 1011. The operating system 1011 essentially controls the execution of other computer programs and provides scheduling, input-output control, file and data management, memory management, and communication control and related services.

In an exemplary embodiment, a conventional keyboard 1050 and mouse 1055 can be coupled to the input/output controller 1035. Other output devices such as the I/O devices 1040, 1045 may include input devices, for example but not limited to a printer, a scanner, microphone, and the like. Finally, the I/O devices 1040, 1045 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1000 can further include a display controller 1025 coupled to a display 1030. In an exemplary embodiment, the system 1000 can further include a network interface 1060 for coupling to a network 1065. The network 1065 can be an IP-based network for communication between the computer 1001 and any external server, client and the like via a broadband connection. The network 1065 transmits and receives data between the computer 1001 and external systems. In an exemplary embodiment, network 1065 can be a managed IP network administered by a service provider. The network 1065 may be implemented in a wireless fashion, e.g., using wireless protocols and technologies, such as WiFi, WiMax, etc. The network 1065 can also be a packet-switched network such as a local area network, wide area network, metropolitan area network, Internet network, or other similar type of network environment. The network 1065 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1001 is a PC, workstation, intelligent device or the like, the instructions in the memory 1010 may further include a basic input output system (BIOS) (omitted for simplicity). The BIOS is a set of essential software routines that initialize and test hardware at startup, start the OS 1011, and support the transfer of data among the hardware devices. The BIOS is stored in ROM so that the BIOS can be executed when the computer 1001 is activated.

When the computer 1001 is in operation, the processor 1005 is configured to execute instructions stored within the memory 1010, to communicate data to and from the memory 1010, and to generally control operations of the computer 1001 pursuant to the instructions.

In an exemplary embodiment, OSC penalty reduction methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present embodiments may be embodied as a system, method or computer program product. Accordingly, one or more aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 11:
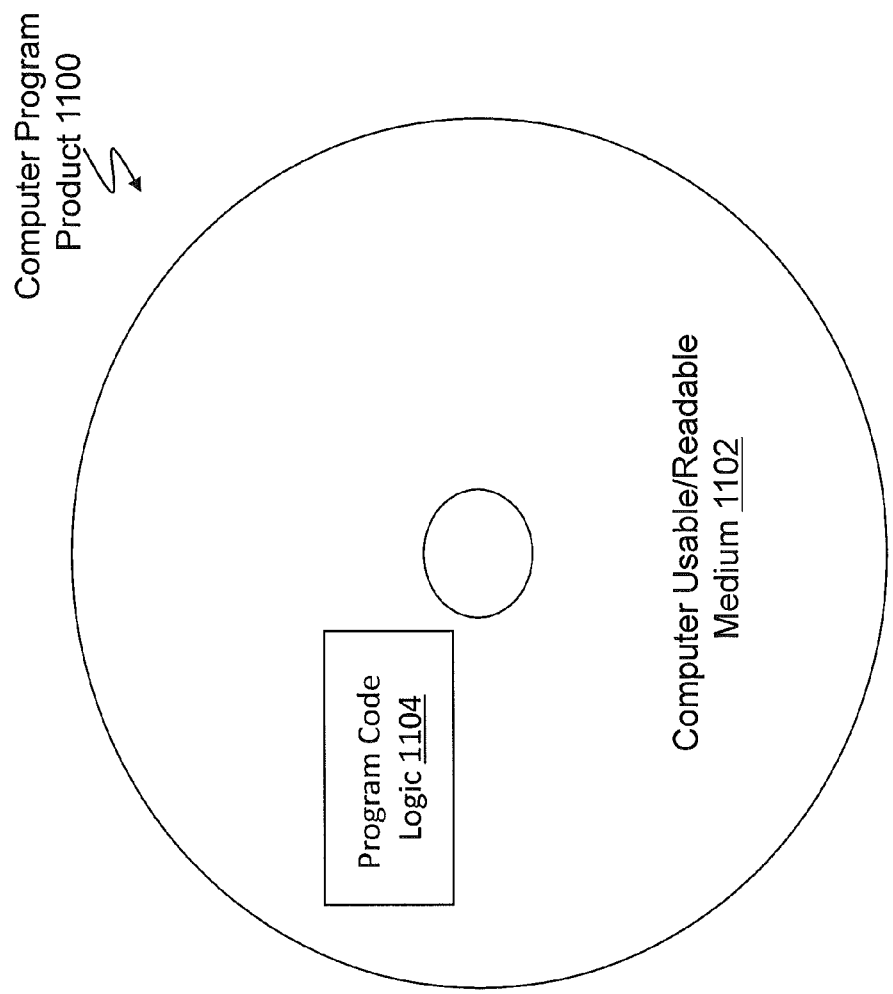
FIG. 11 illustrates a computer-readable medium according to one embodiment of the present disclosure.

Referring now to FIG. 11, in one example a computer program product 1100 includes, for instance, one or more storage media 1102, wherein the media may be tangible and/or non-transitory, to store computer readable program code means or logic 1104 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the embodiments.

Embodiments include a computer system, method, computer program product, and any other device or apparatus for detecting potential dependencies between a load UOP and one or more store previously-decoded UOPs and forcing a dependency between the load UOP and the store UOPs based on comparing the values of address determination fields of the load UOP with the values of the address determination fields of the one or more store UOPs.

One embodiment includes classifying a load UOP into one of a plurality of groups of load UOPs according to a location of the address determination fields within the load UOP. In another embodiment comparing the values of the address determination fields of the load UOP with the values of the address determination fields of the one or more previously-decoded store UOPs includes performing the comparing of the values of the address determination fields according to the classifying of the load UOP into the one of the plurality of groups of load UOPs In one embodiment, the one or more previously-decoded store UOPs includes at least two previously-decoded store UOPs. In one embodiment, the address determination fields include at least a base field and a displacement field, and the embodiment includes applying a mask to the displacement field of at least one of the load UOP and the one or more previously-decoded store UOPs to increase a range of address values in which the values of the address determination fields of the load UOP correspond to the values of the address determination fields of the one or more of the previously-decoded store UOPs.

One embodiment includes adjusting a value of the mask based on an operand length of one or more of the load UOP and the one or more previously-decoded store UOPs. One embodiment further includes adjusting a value of the mask based on a previously-detected correspondence between the load UOP and at least one of the one or more previously-decoded store UOPs for which the values of the address determination fields of the load UOP are not the same as the values of the address determination fields of the one or more previously-decoded store UOPs.

One embodiment includes clearing a first store UOP from among the one or more previously-decoded store UOPs based on a determination that a value of one or more of the address determination fields of the one or more previously-decoded store UOPs has changed Technical effects and benefits include reducing OSC penalties by detecting load and store UOP dependencies prior to decoding and/or dispatching instructions. Instructions may be cracked into UOPs, load and store UOPs may be detected and grouped, and UOPs may be compared based on locations of address determination fields to provide determine whether a dependency exists. A dependency may be forced between the load and store UOPs based on the comparison, and the load UOP may be issued after the store UOP. Accordingly, even in systems in which complex instructions are cracked, individual UOPs may be analyzed to determine dependencies prior to dispatch of the UOPs. As a result, CPI rates may be improved and computer system performance may be improved.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for reducing operand store compare (OSC) penalties, the system comprising:
   memory configured to store instructions and data; and
   a processor comprising an instruction fetch unit, a cracking unit, an instruction decode unit, an issue unit, and a unit of operation (UOP) comparison unit that includes a load/store identification unit, a classifying unit, and a comparison unit, the processor configured to execute the instructions to perform a method comprising:
   prior to sending an instruction received from the instruction fetch unit to the issue unit for issuance of the instruction to an execution unit:

cracking and decoding, by the cracking unit and the instruction decode unit, the instruction into one or more UOPs, each UOP comprising instruction text (itext) and including address determination fields required to form an operand storage address, the address determination fields including at least one of a base address field, an index address field, and a displacement address field;

identifying, by the load/store identification unit of the UOP comparison unit, a load UOP among the one or more UOPs;

categorizing, by the classifying unit of the UOP comparison unit, the load UOP into one of a plurality of groups of load UOPs according to a location of the address determination fields within the load UOP;

comparing, by the comparison unit of the UOP comparison unit, values of the address determination fields of the load UOP with values of address determination fields of one or more previously-decoded store UOPs to detect a dependency between the load UOP and the one or more previously-decoded store UOPs, wherein one or more least significant bits of the load UOP are masked during the comparing; and forcing, by the comparison unit of the UOP comparison unit the dependency between the load UOP and the one or more previously-decoded store UOPs, wherein the forcing the dependency causes the load UOP to be issued after the one or more previously-decoded store UOPs.

2. The computer system according to claim 1, wherein comparing the values of the address determination fields of the load UOP with the values of the address determination fields of the one or more previously-decoded store UOPs includes performing the comparing of the values of the address determination fields according to the classifying of the load UOP into the one of the plurality of groups of load UOPs.

3. The computer system according to claim 1, wherein the one or more previously-decoded store UOPs includes at least two previously-decoded store UOPs.

4. The computer system according to claim 1, wherein the address determination fields include at least the base field and the displacement field, the method further comprising:

applying a mask to the displacement field of at least one of the load UOP and the one or more previously-decoded store UOPs to increase a range of address values in which the values of the address determination fields of the load UOP correspond to the values of the address determination fields of the one or more of the previously-decoded store UOPs.

5. The computer system according to claim 4, the method further comprising:

adjusting a value of the mask based on an operand length of one or more of the load UOP and the one or more previously-decoded store UOPs.

6. The computer system according to claim 4, the method further comprising:

adjusting a value of the mask based on a previously-detected correspondence between the load UOP and at least one of the one or more previously-decoded store UOPs for which the values of the address determination fields of the load UOP are not the same as the values of the address determination fields of the one or more previously-decoded store UOPs.

7. The computer system according to claim 1, the method further comprising:

clearing a first store UOP from among the one or more previously-decoded store UOPs based on a determination that a value of one or more of the address determination fields of the one or more previously-decoded store UOPs has changed.

8. A computer implemented method for reducing operand store compare (OSC) penalties, the method comprising:

prior to sending an instruction received from an instruction fetch unit to an issue unit for issuance of the instruction to an execution unit:

cracking and decoding, by a cracking unit and a decoding unit of a computer, the instruction into one or more units of operation (UOPs), each UOP comprising instruction text (itext) and including address determination fields, the address determination fields including at least one of a base address field, an index address field, and a displacement address field;

identifying, by a load/store identification unit of a UOP comparison unit of the computer, a load UOP among the one or more UOPs;

classifying, by a classifying unit of the UOP comparison unit, the load UOP into one of a plurality of groups of load UOPs according to a location of the address determination fields within the load UOP;

comparing, by a comparison unit of the UOP comparison unit of the computer, values of the address determination fields of the load UOP with values of address determination fields of one or more previously-decoded store UOPs to detect a dependency between the load UOP and the one or more previously-decoded store UOPs, wherein one or more least significant bits of the load UOP are masked during the comparing; and forcing, by the comparison unit of the UOP comparison unit of the computer, the dependency between the load UOP and the one or more previously-decoded store UOPs, wherein the forcing the dependency causes the load UOP to be issued after the one or more previously-decoded store UOPs.

9. The method according to claim 8, further comprising: executing the one or more UOPs at least one of simultaneously and out of order.

10. The method according to claim 8, wherein the comparing is performed based on a group to which the load UOP belongs.

11. The method according to claim 8, wherein the one or more previously-decoded store UOPs includes at least two previously-decoded store UOPs.

12. The method according to claim 8, wherein the address determination fields include at least the base field and the displacement field, the method further comprising:

applying a mask to the displacement field of at least one of the load UOP and the one or more previously-decoded store UOPs to increase a range of address values in which the values of the address determination fields of the load UOP correspond to the values of the address determination fields of the one or more of the previously-decoded store UOPs.

13. The method according to claim 12, further comprising:

adjusting a value of the mask based on an operand length of one or more of the load UOP and the one or more store previously-decoded UOPs.

14. The method according to claim 8, further comprising:

clearing a first store UOP from among the one or more store previously-decoded UOPs based on a determination that a value of one or more of the address determination fields of the one or more store previously-decoded UOPs has changed.

15. A computer program product for reducing operand store compare (OSC) penalties, the computer program product comprising:
  a non-transitory computer readable storage medium readable by a processor and storing instructions for execution by the processor for performing a method comprising:
  prior to sending an instruction received from an instruction fetch unit to an issue unit for issuance of the instruction to an execution unit:
  cracking and decoding, by a cracking unit and a decoding unit of the processor, the instruction into a plurality of units of operation (UOPs), each UOP comprising instruction text (itext) and including address determination fields, the address determination fields including at least one of a base address field, an index address field, and a displacement address field;
  identifying, by a load/store identification unit of a UOP comparison unit of the processor, a load UOP among the one or more UOPs;
  classifying, by a classifying unit of the UOP comparison unit, the load UOP into one of a plurality of groups of load UOPs according to a location of the address determination fields within the load UOP;
  comparing, by a comparison unit of the UOP comparison unit of the processor, values of the address determination fields of the load UOP with values of address determination fields of one or more previously-decoded store UOPs to detect a dependency between the load UOP and the one or more previously-decoded store UOPs wherein one or more least significant bits of the load UOP are masked during the comparing; and
  forcing, by the comparison unit of the UOP comparison unit of the processor, the dependency between the load UOP and the one or more previously-decoded store UOPs, wherein the forcing the dependency causes the load UOP to be issued after the one or more previously-decoded store UOPs.

16. The computer program product according to claim 15, the method further comprising:
  executing the one or more UOPs at least one of simultaneously and out of order.

17. The computer program product according to claim 15, wherein the comparing is performed based on a group to which the load UOP belongs.

18. The computer program product according to claim 15, wherein the address determination fields include at least the base field and the displacement field, the method further comprising:
  applying a mask to the displacement field of at least one of the load UOP and the one or more previously-decoded store UOPs to increase a range of address values in which the values of the address determination fields of the load UOP correspond to the values of the address determination fields of the one or more of the previously-decoded store UOPs.

19. The computer program product according to claim 15, the method further comprising:
  clearing a first store UOP from among the one or more previously-decoded store UOPs based on a determination that a value of one or more of the address determination fields of the one or more previously-decoded store UOPs has changed.

\* \* \* \* \*